United States Patent [19]

Takagi et al.

[11] Patent Number: 4,615,260
[45] Date of Patent: Oct. 7, 1986

[54] PNEUMATIC ACTUATOR FOR MANIPULATOR

[75] Inventors: Takeo Takagi, Yokohama; Yuji Sakaguchi, Kawasaki, both of Japan

[73] Assignee: Bridgestone Corporation, Tokyo, Japan

[21] Appl. No.: 603,819

[22] Filed: Apr. 25, 1984

[30] Foreign Application Priority Data

| Apr. 25, 1983 | [JP] | Japan | 58-71404 |
| May 13, 1983 | [JP] | Japan | 58-82473 |
| Sep. 2, 1983 | [JP] | Japan | 58-160543 |
| Sep. 2, 1983 | [JP] | Japan | 58-160544 |
| Sep. 29, 1983 | [JP] | Japan | 58-179206 |

[51] Int. Cl.$^4$ .............................................. F16J 3/00
[52] U.S. Cl. ............................................ 92/92; 901/22
[58] Field of Search ..................... 92/92, 91, 103 F; 901/21, 22; 414/729, 744 R, 749

[56] References Cited

U.S. PATENT DOCUMENTS

| 2,789,580 | 4/1957 | Woods . | |
| 3,086,550 | 4/1963 | Cummings | 92/103 F |
| 3,638,536 | 2/1972 | Kleinwachter et al. | 92/92 |
| 3,645,173 | 2/1972 | Yarlott | 92/92 |

FOREIGN PATENT DOCUMENTS

| 503775 | 7/1930 | Fed. Rep. of Germany . | |
| 2330393 | 1/1975 | Fed. Rep. of Germany | 901/22 |
| 2076768 | 9/1971 | France . | |
| 847656 | 9/1960 | United Kingdom | 901/22 |
| 971556 | 9/1964 | United Kingdom . | |
| 631329 | 11/1978 | U.S.S.R. | 901/22 |

Primary Examiner—Robert J. Spar
Assistant Examiner—Dennis Williamson
Attorney, Agent, or Firm—Sughrue, Mion, Zinn, Macpeak and Seas

[57] ABSTRACT

A pneumatic actuator includes an elastic tubular body, closure members sealingly closing its ends and a braided structure made of braided cords reinforcing the tubular body. The braided structure is expanded in its radial direction and simultaneously contracted in its axial direction together with the tubular body when pressurized fluid is supplied into the tubular body. According to the invention the braided cords of the braided structure comprises monofilaments each having a smoothly rounded outer surface of a large radius of curvature. A protective layer may be provided between the tubular body and the braided structure or a filler such as an incompressible fluid substance having no constant shape is provided in the tubular body, or diameters of both ends of the braided structure and braided angles at both the ends are made larger than those at a substantially mid portion of the braided structure. The actuator according to the invention decreases damage of the tubular body to elongate its service life and exhibits an improved contacting performance and high fatigue strength and can greatly save air consumption to eliminate the disadvantage of much air consumption of the air-bag type actuator without adversely affecting its advantages.

11 Claims, 30 Drawing Figures

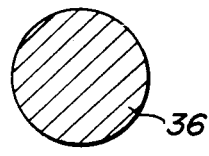
FIG_7
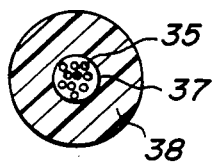
FIG_8
FIG_9
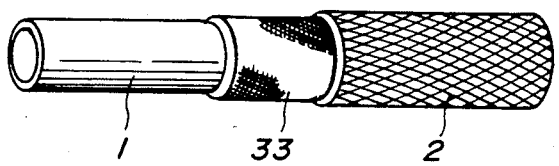
FIG_10
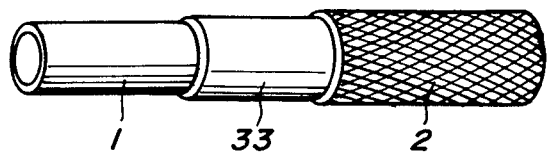
FIG_11

FIG_14
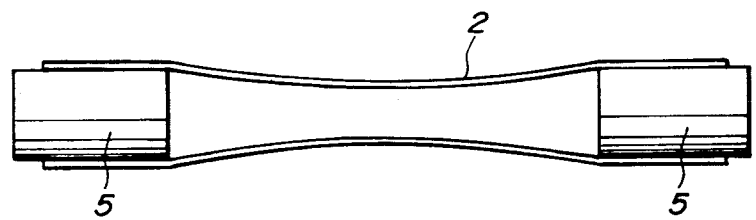
FIG_15
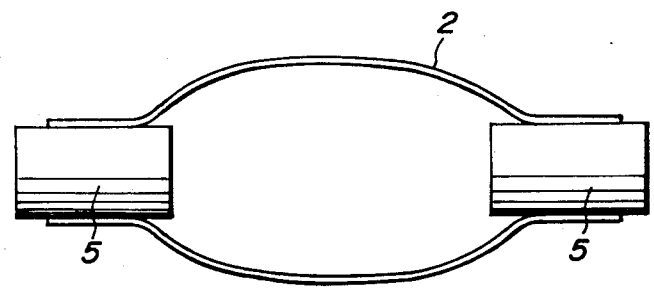

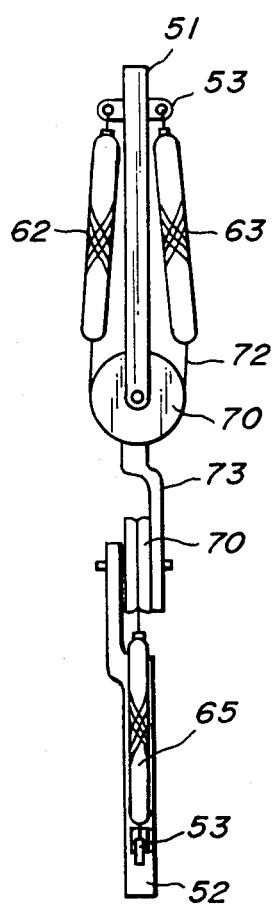
FIG_21a
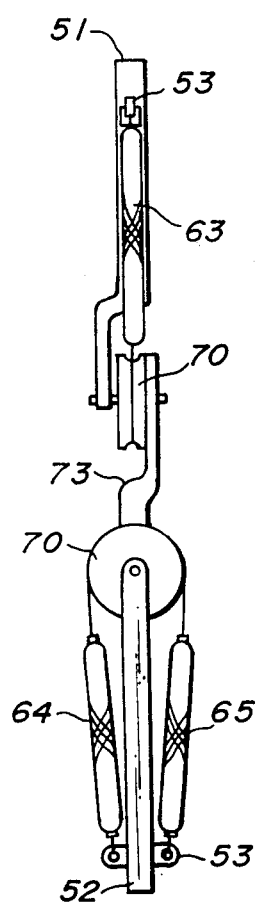
FIG_21b

PNEUMATIC ACTUATOR FOR MANIPULATOR

BACKGROUND OF THE INVENTION

1. Field of the Invention

This invention relates to an improvement of an actuator for operating a manipulator (artificial hand) or the like for treating or handling radioactive substances surrounded by shield walls or hot cells for protecting from contamination of radiativity in storing, replacing and distributing the radioactive substances and for other purposes such as experiments and working.

2. Description of the Prior Art

Various kinds of actuators have been proposed for manipulators provided for the above mentioned hot cells. Among these proposals, electric systems including electric motors require reduction gears to increase total weight and make their construction complicated, and moreover unavoidably generate sparks in operation, which make impossible to use the electric systems at locations requiring explosion-proof. Hydraulic systems have disadvantages in that hydraulic units are expensive and heavy and oils used in the units tend to contaminate themselves, other parts and rooms.

Pneumatic systems are preferably used in case particularly requiring explosion-proof. However, pneumatic actuators in general do not provide smooth movements due to sliding resistance between cylinders and pistons which are worse still usually made of steel, so that the self weights of their operating or movable parts are too large in comparison with their operating forces, resulting in lower operating accuracy.

With these hitherto used driving systems, outputs are usually constant during displacement, so that positioning in strokes cannot be effected smoothly. As a result, arms accidentally collide against objects to damage them and, therefore, these systems require great skill.

On the other hand, air bag type actuators have been known. In such actuators, operating forces are obtained from axial contracting forces of the air bags due to enlargement of their diameters when applying controlling pressure to them. In addition to the light weight of the bags themselves, they have advantages of no risk of air leakage and no problems due to friction because of no sliding parts. The amount of air enclosed in the bag for the application of the controlling pressure increases due to the expansion of the bag in comparison with the pneumatic cylinders and is dissipated into the atmosphere when it is released. It is disadvantageous to consume a great amount of air for operating. Moreover, the above controlling pressure acts upon all over inner surfaces of cavity walls in the air bag, so that the effective axial contracting forces are reduced by resistance representative of a product of the control pressure and cross-sectional area perpendicular to the axis of the bag subjected to the control pressure at least during an initial period of its operation.

A pneumatic actuator of such an air bag type for example as shown in FIG. 1 has been publicly known disclosed in Japanese Patent Application Publication No. 40,378/77.

The pneumatic actuator as shown in FIG. 1 comprises a tubular body 1, a reinforcing braided structure 2 externally thereon, closure members 3 at both ends and a clamp sleeve 4. The tubular body 1 is preferably made of a rubber or rubber-like elastomer which is air-impermeable and flexible. However, other materials equivalent thereto, for example, various kinds of plastics may be used for this purpose. The reinforcing braided structure 2 reinforced by cords is somewhat similar to, for example, those conventional in pressure-resistant rubber hoses, whose braided angles are approximate to what is called an angle of repose (54°44'). With the braided structure of the pneumatic actuator, initial braided angles $\theta_o$ are preferably of the order of 20° in order to obtain the above angle of repose when the reinforcing structure is expanded to the maximum diameter due to inner pressure filled or supplied in the tubular body 1. In this case, conditions of use are determined so as to permit a strain under normally used conditions to be of the order of 0.3.

The reinforcing cords used in the braided structure 2 are organic or inorganic high tensile fibers, preferably, for example, twisted or nontwisted filament bundles of aromatic polyamide fibers (trade name, KEVLAR) or very fine metal wires.

With a considerably small angle of the initial braided angle $\theta_o$ such as 20°, it is not necesarily easy to braid the outer circumference of the tubular body 1. For example, however, a braided structure obtained by a conventional hose braiding machine is stretched in its axial direction to be commensurate with the above initial value and is then fitted on the tubular body 1 under the stretched condition, thereby obtaining the desired braided structure. In this case, a suitable adhesive may be applied the outer circumference of the tubular body 1. An outer sheath of a weatherproof or injury-protective film may be preferably provided on the braided structure 2.

Each closure member 3 comprises a nipple 5 adapted to be closely fitted in each end of the tubular body 1 preferably with an adhesive for sealing the tubular body from the atmosphere, a flange 6 for positioning the closure member relative to the tubular body, and an eye or yoke 7 having an aperture for a connecting pin (not shown). The nipple 5 is preferably provided on its outer periphery with annular protrusions 8 each having a steep taper surface toward the eye 7 and a gentle taper surface in an opposite direction for preventing the nipple 5 from being removed. One of the closure members 3 is formed at least on one side with a connecting aperture 11 communicating with an inner cavity 10 of the tubular body 1 through an aperture 9 formed in the nipple 5 in its axial direction. A fitting 12 is fitted in the connecting aperture 11 of the closure member 3.

Each clamp sleeve 4 is a cylindrical metal member engaging the flange 6 so as to cover the end outer circumference of the tubular body 1 and having a flare 13. The clamp sleeve 4 is partially pressed toward the nipple 5 in its radial directions to sealingly unite the closure member 3 with the tubular body 1. Reference numeral 14 in FIG. 1 denotes axial depressions caused by a calking tool in its process.

To the fitting 12 is connected an operating pressure source, for example, an air compressor through a line having a three-way valve (not shown).

When a controlled pressure P is applied into the inner cavity 10 of the tubular body 1 through the fitting 12, the braided structure 2 is expanded from the position shown in solid lines to that shown in phantom lines in FIG. 1 to enlarge the initial braided angles $\theta_o$ to $\theta_x$ or in a pantograph movement of the reinforcing cords of the braided structure 2 so as to cause an enlargement of the diameter of the tubular body 1 and a contraction in its axial direction caused thereby. A force F of the contraction is given by the following equation (1)

$$F = P\frac{\pi}{4} d^2 \left(\frac{\sin\theta_x}{\sin\theta_o}\right)^2 \left(\frac{2}{\tan^2\theta_x} - 1\right) \quad (1)$$
$$\text{or } P\frac{\pi}{4} d^2 \frac{1}{\sin^2\theta_o} (3\cos^2\theta_x - 1)$$

On the other hand, when the controlled pressure in the cavity 10 of the tubular body 1 is released through the three-way valve into the atmosphere, the tubular body 1 of course regains its length with decrease of the braided angle $\theta_x$.

It is therefore understood that such a pneumatic actuator can bring about bending and extending movement or articulate movements between two pivotally connected or articulated operating arms to which the eyes or yokes 7 of the closure members 3 of the pneumatic actuator are connected by means of pins.

In general, the reinforcing braided structure 2 includes the reinforcing cords embedded in the proximity of an outer surface of the tubular body of a rubber-like elastomer so as to be securely united with each other. With this arrangement, however, the movement of the reinforcing cords in articulated movements of arms is restrained by the rubber-like elastomer to reduce the force of contraction. It is, therefore, preferable to separate the reinforcing cords from the tubular body so as to permit free movements of the cords. However, such a construction permitting the reinforcing cords to separate from the tubular body encounters another problem. Each reinforcing cord consists of a number of fine filaments 15 having diameters of 0.02–0.03 mm which are twisted or nontwisted as shown in FIG. 2. Upon expansion of the elastic tubular body, the fine filaments are likely to bite into the tubular body due to the greatly changed braided angles of the cords. Accordingly, the filaments injure the surface of the tubular body, as if they were very sharp knives, resulting in breaking down of the tubular body.

Even if the pneumatic actuator includes the tubular body with reinforcing cords embedded therein so as not to separate therefrom, there is in general a tendency of the cords to penetrate into the elastic tubular body to reduce the service life of the tubular body and hence the actuator, because its diameter increases to 2-3 times of its original diameter and its axial length contracts to 20–40% of its original length so as to cause maximum stresses acting upon the reinforcing cords.

In general, with the above conventional construction of the actuators, there is a relation between the initial braided angles $\theta_o$, changed braided angles $\theta_x$ upon contraction and contractive strains $\epsilon$.

$$\epsilon = (\cos\theta_o - \cos\theta_x) \quad (2)$$

Moreover, there is a relation as set forth in the following equation (3) between original diameters $D_o$ of the braided structure 2 and contracted diameters D and a relation as the following equation (4) between the contractive forces F and the other parameters including controlled pressure P.

$$D = D_o \frac{\sin\theta}{\sin\theta_o} \quad (3)$$

$$F = \frac{\pi}{4} D_o^2 P \frac{1}{\sin^2\theta_o} \{3(1-\epsilon)^2 \cos\theta_o - 1\} \quad (4)$$

These relations hold true at approximate center zones of the actuators. However, these relations do not hold true at both the ends of the actuators, because the diameters at the ends are restrained from changing. As shown in FIG. 4 schematically illustrating an expanded braided structure 2 from an original condition shown in FIG. 3, the ends of the braided structure 2 are prevented from expanding to cause unnatural strains of the structure which would give rise to fatigue failure of the structure and obstruct the occurrence of the expected contractive force.

A solid line A in FIG. 5 illustrates a relation between the contractive force F and the strain $\epsilon$ obtained from the equation (4) when the controlled pressure P is constant. A broken line B in FIG. 5 was obtained by actually measuring contractive forces and strains with actuators of the prior art having constant diameters of the brained structures and constant brained angles. The broken line B is fairly different from the theoretical line A due to the restraint of both the ends of the brained structure 2. A dot-and-dash line C and a two-dot line I will be explained latter.

As above described, the actuator is radially expansible and simultaneously axially contractible with the aid of controlled pressure applied therein has the various advantages of light weight as a whole, smooth movements in operation and reliable performance of positioning which are not obtained by the systems using electric motors or hydraulic piston and cylinder assemblies. Various applications are considered utilizing these superior characteristics of the expansible and contractible actuator.

FIG. 6 illustrates a linear driving system actuated with pneumatic pressure including a servo-valve having a torque motor 21, nozzles 22 and 23, a flapper 24 and throttle valves 25 and 26, and two elastic actuators 27 and 28 arranged in series with aligned axes.

With this arrangement, for operation, the torque motor 21 is energized and the flapper 24 is deflected for example in a direction shown by an arrow D, so that a clearance between the nozzle 22 and the flapper 24 becomes smaller and a clearance between the nozzle 23 and the flapper 24 becomes correspondingly larger. Accordingly, a back pressure on a side of the nozzle 22 approaches the supplied pressure of the air and a back pressure on a side of the nozzle 23 approaches the atmospheric pressure, respectively. As a result, the pressurized air is supplied into the actuator 27, while the pressurized air in the actuator 28 is exhausted, so that a mass point 29 is driven in a direction shown by an arrow E. When the flapper 24 is deflected in the direction opposite to the arrow D, it should be understood that the mass point 29 is driven in the direction opposite to the arrow E.

There has been proposed a driving system similar to the above linear driving system, wherein back pressure of nozzles is changed to move a spool of a guide valve to change air flow.

However, the above systems are expensive to manufacture due to high cost torque motors used therein, complicated in construction and slow in response. Under a steady condition, moreover, the pressurized air leaks at nozzles to cause noise and to increase consumption of the pressurized air. In addition, exact positioning cannot be easily effected with these systems.

SUMMARY OF THE INVENTION

It is a primary object of the invention to provide an improved actuator for a manipulator, which eliminates the disadvantages of the prior art.

It is another object of the invention to provide an improved actuator comprising braided structure whose cords do not bite into a tubular body upon expansion, thereby decreasing damage of the tubular body to elongate its service life.

In order to achieve these objects, the pneumatic actuator including a tubular body is made of a rubber-like elastic material, closure members sealingly close ends of said tubular body and a braided structure reinforcing is outside of said tubular body and made of braided cords of high tensile fibers. The braided structure is expanded in its radial direction and being simultaneously contracted in its axial direction together with said tubular body when pressurized fluid is supplied in a cavity of said tubular body through one of said closure member. According to the invention said braided cords of said braided structure comprises monofilaments each having a smoothly rounded outer surface of a large radius of curvature.

In a preferred embodiment of the invention, a protective layer is provided between the tubular body and the braided structure.

It is a further object of the invention to provide a pneumatic actuator whose braided structure has an improved contracting performance and high fatigue strength and can greatly save air consumption to eliminate the disadvantage of much air consumption of the air-bag type actuator without adversely affecting the advantages of the air-bag type actuator.

This object can be achieved by the actuator constructed according to the invention in a manner that diameters of both ends of the braided structure and braide angles at both the ends are made larger than those at a substantially mid portion of the braided structure, and that a filler is provided in the cavity of the tubular body without obstructing the expansion and contraction of the tubular body.

In a preferred articulated arm for a manipulator including at least two pneumatic actuators according to the invention, first and second arm members, one ends of the actuators being connected to the first arm member and the other ends of the actuators being connected to the second arm member.

A preferred driving control system for a connection of two pneumatic actuators according to the invention comprises flowing-in control valves for controlling the fluid flowing into the actuators, respectively and flowing-out control valves for controlling the fluid flowing-out of the actuators, respectively, the flowing-in and flowing-out control valves for each the actuator being operated reversely in a manner such that when the flowing-in valve is opened, the flowing-out valve is closed and vice versa, and the flowing-in control valves for the actuators being operated reversely in a manner such that when one of the flowing-in control valves is opened, the other is closed and vice versa.

The invention will be more fully understood by referring to the following detailed specification and claims taken in connection with the appended drawings.

BRIEF DESCRIPTION OF THE DRAWINGS

FIG. 7 is a schematic sectional view of a cord for constituting a braided structure of a pneumatic actuator according to the invention;

FIG. 8 is a schematic sectional view of a preferred embodiment of the cord used for the actuator according to the invention;

FIG. 9 is a schematic sectional view of another embodiment of the cord used for the actuator according to the invention;

FIG. 10 is a partial perspective view of a preferred embodiment of the actuator having a protective layer according to the invention;

FIG. 11 is a partial perspective view of a modified embodiment of the actuator shown in FIG. 10;

FIG. 14 is a schematic sectional view of the pneumatic actuator shown in FIG. 13 for explaining its operation;

FIG. 15 is a schematic sectional view of the actuator shown in FIG. 14, when expanded;

FIG. 20b is a side view of the articulated arm shown in FIG. 20a;

FIG. 21a is a modification of the articulated arm shown in FIGS. 20a and 20b;

FIG. 21b is a side view of the articulated arm shown in FIG. 21a;

FIG. 22b is a view illustrating the angular movement detecting means shown in FIG. 22a;

DETAILED DESCRIPTION OF THE PREFERRED EMBODIMENT

Figure 1:
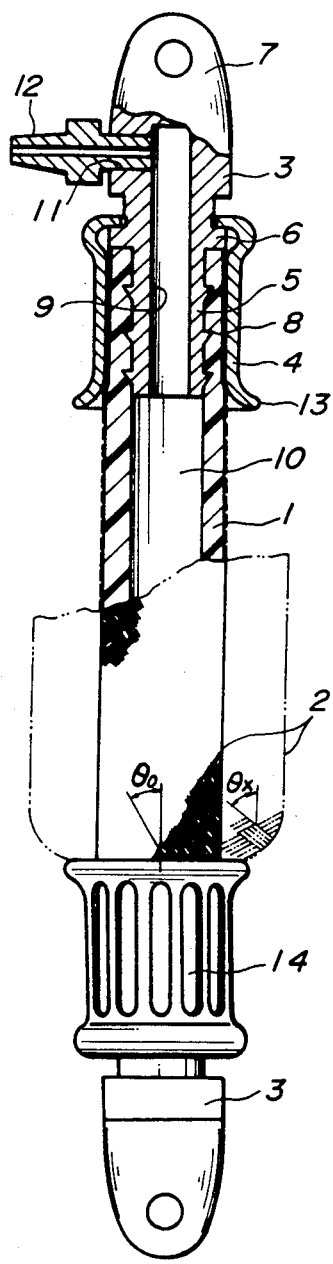
FIG. 1 is a front elevation partially in section of an air-bag type actuator of the prior art.

FIGS. 7-9 illustrate in section preferred reinforcing cords having smooth rounded outer surfaces used for the actuator according to the invention. FIG. 7 shows the cord comprising a monofilament or steel wire 16 of a circular section having a diameter of the order of 0.5-2 mm. FIG. 8 illustrates a reinforcing cord comprising a number of fine filaments 35 twisted or nontwisted to form a bundle 37 and a rubber-like elastomer or synthetic resin 38 coated on said bundle. FIG. 9 shows a flat yarn 39 having an elongated circle or elliptical cross-section. These reinforcing cords are made to have smooth surfaces to avoid sharp edges contacting surfaces of elastic tubular bodies and to have wide surfaces contacting the tubular bodies as much as possible to reduce contacting surface pressure, thereby greatly reducing damage to the tubular bodies due to penetration of sharp filaments into the bodies.

In order to compare these reinforcing cords and those of the prior art, the inventors have carried out a durable test of actuators including rubber tubular bodies having inner diameters 8 mm, thicknesses of walls 1 mm and lengths 300 mm and braided structures secured about the tubular bodies and having braided density of 90%. In this experiment, monofilaments made of polyester each having a diameter of 0.4 mm according to the invention were used as reinforcing cords, while reinforcing cords consisting of three bundles each consisting of 44 filaments having a diameter of 0.02 mm according to the prior art were used. In measuring, the pressure of operating air was changed from 2 kg/cm² to zero kg/cm² or atmospheric pressure with cycles once per one second. Each actuator was subjected to a load of 1 kg hanging from the actuator during measuring. The rubber tubular bodies having braided cords of the prior art were broken down at 13,600 cycles of pressure change, while the tubular bodies according to the invention were broken down at 67,000 cycles.

As above described, according to the invention the reinforcing cords constituting the braided structure are monofilament cords having smoothly rounded outer surfaces of large radii of curvatures to reduce contact surface pressure with surfaces of elastic tubular body, thereby decreasing damage of the tubular body to elongate its service life two or more times.

FIG. 10 illustrates another preferred embodiment of the invention, wherein a protective layer 33 is provided between a tubular body 1 and a braided structure 2 such that even if the tubular body is expanded 2-3 times, the tubular body 1 and the braided structure 2 are not brought into contact with each other and the protective layer 33 does not provide any resistance to the expansion of the tubular body 1. Fine fiber filaments similar to those used in the braided structure 2 are made as highly dense as possible, for example, near to 100% and the filaments are finely braided so as to be expansible and contractible as in a tricot weave to form the protective layer 33. FIG. 10 illustrates such a protective layer of the tricot weave.

With this arrangement, the tubular body does not directly contact the reinforcing braided structure, thereby eliminating the damage of the tubular body by the reinforcing braided structure to remarkably improve the life of the tubular body and hence the actuator.

FIG. 11 illustrates a further embodiment of the invention, wherein a tubular body consists of two elastic bodies in a double construction which are a tubular body 1 and a protective layer 33 made of materials different from each other. The material for the protective layer 33 is an elastic material which is high resistant to injury or damage and does not obstruct the expansion and contraction as much as possible, for example, a high molecular plastic material such as urethane or the like. The protective layer 33 may be glued to the tubular body 1 with a bonding agent or not.

Figure 12:
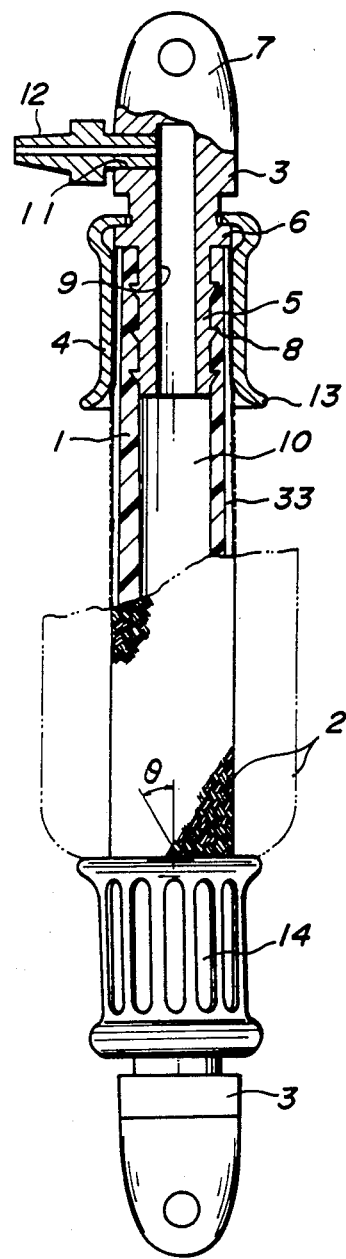
FIG. 12 is a partial sectional view of an actuator comprising the protective layer shown in FIG. 10 or 11.

FIG. 12 shows an actuator to which the embodiment shown in FIGS. 10 and 11 are applied, wherein like parts have been designated by the same reference numerals as those in FIG. 1.

With the embodiments shown in FIGS. 10-12, the protective layer is provided between the tubular body and the reinforcing braided structure to elongate the life of the tubular structure to the order of several million times of expansion and contraction which is substantially near to times of inherent fatigue failure of the tubular body. With the simple and inexpensive construction, a long life pneumatic actuator is provided.

Referring back to FIG. 5, the broken line B is fairly different from the theoretical line A due to the restraint of both the ends of the braided structure 2.

Assuming that initial braided angles $\theta_o$ is 20°, when contractive strains $\epsilon$ are 20%, a contracted diameter D of the braided structure is obtained by substituting the values of $\theta_o$ and $\epsilon$ into the equations (2) and (3) as follows.

$$D = 1.93 D_o \, (\theta = 41°)$$

Figure 5:
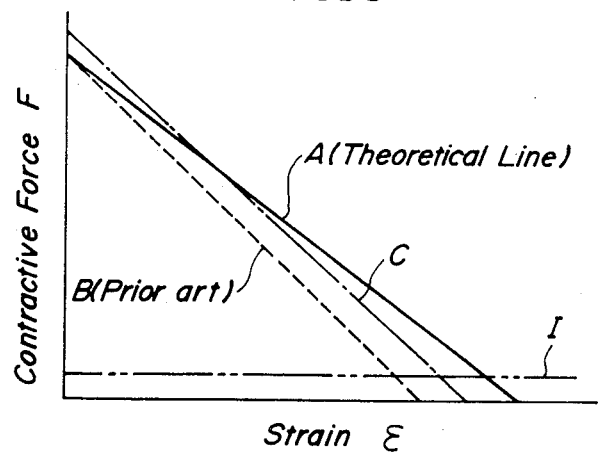
FIG. 5 is a graph illustrating relation between contractive force and strain of pneumatic actuators.
Figure 6:
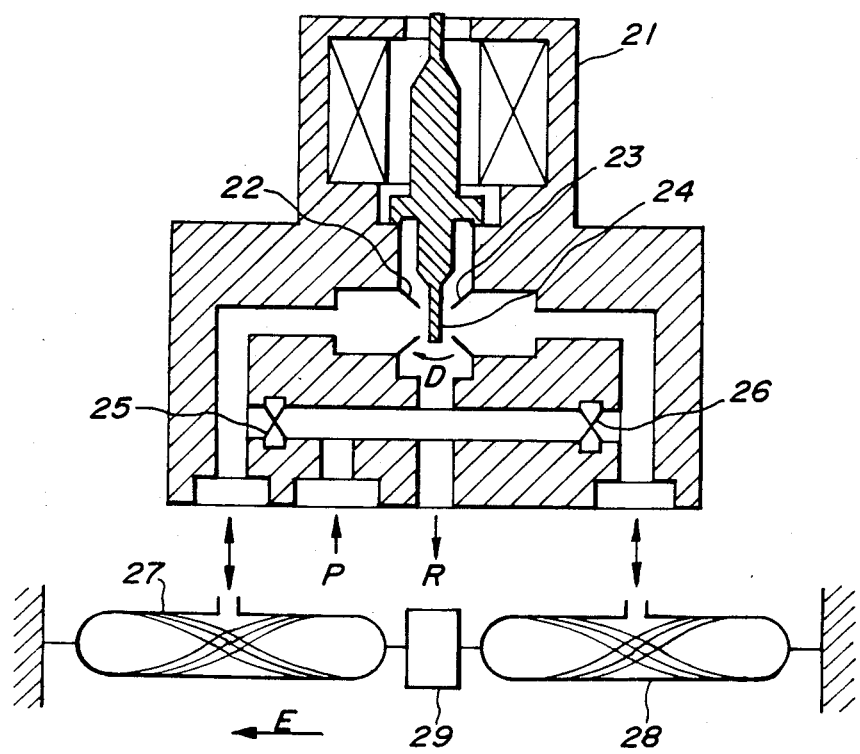
FIG. 6 is a schematic view of a linear driving device of the prior art.

Therefore, if diameters of both ends of a braided structure are previously set as twice as a diameter of at its mid portion, constructive forces should be substantially coincident with the theoretical values as shown in a dot-and-dash line C in FIG. 5. Braided angles at the ends having the twice diameters are 41°.

In consideration of this fact, according to a further embodiment of the invention diameters at ends of a braided structure are previously made larger by an amount to be reduced when contracted to a contractive strain of 10-20%.

Figure 13:
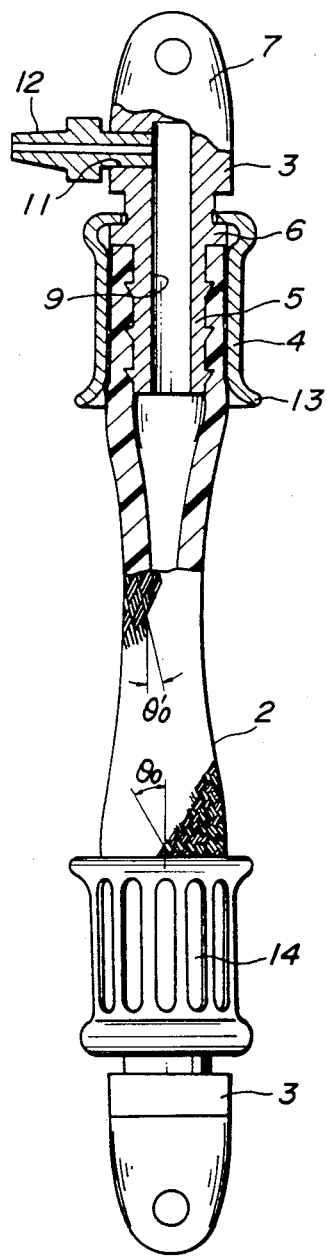
FIG. 13 is a partial sectional view of a preferred embodiment of the actuator comprising a modified braided structure according to the invention.

In making such a braided structure having larger diameters at its ends, larger sized nipples may be forced into a straight tubular body in assembling. However, it is preferable to initially make a tubular body having a configuration integrally with nipples as shown in FIG. 13. FIG. 14 schematically illustrates a braided structure 2 with nipples 5 made in this manner, which will be radially expanded and axially contracted as shown in FIG. 15.

With this arrangement shown in FIGS. 13-15, the diameters and braided angles at ends of a braided structure are larger than those at its mid portion, thereby improving the contracting performance and fatigue strength of the braided structure and hence of the actuator.

Figure 16:
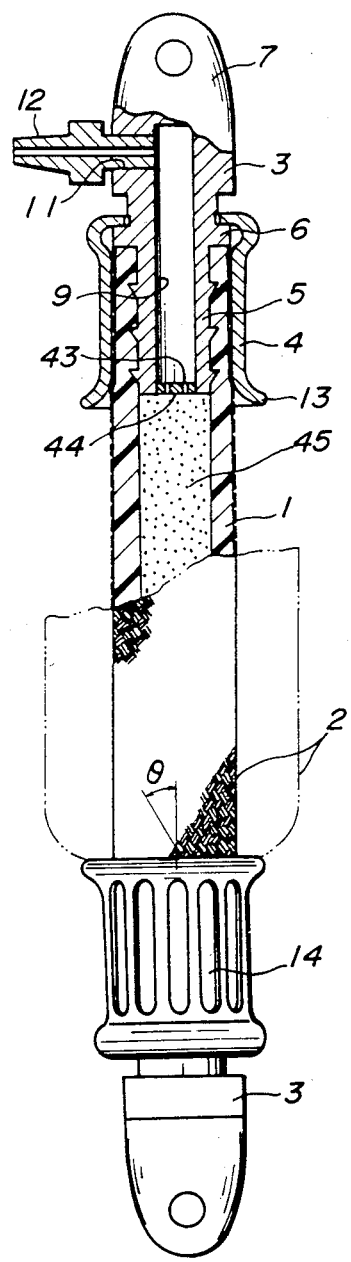
FIG. 16 is a partial sectional view of a further preferred embodiment of the actuator comprising a filler according to the invention.

Referring to FIG. 16, wherein like parts have been designated by the same reference numerals as those in FIGS. 1, 12 and 13, a filler 45 is filled in an inner cavity of a tubular body 1 substantially without obstructing the expansion and contraction of the tubular body. The filler is preferably an incompressible fluid substance having no constant shape as a whole, for example, solid grains such as sand or ballast, a liquid such as water or grease-like sticky substance or pellets capsuled such a liquid therein, or a bar-like or cylindrical elastic body flexible only in expanding and contracting directions. With the solid grains, particularly, they preferably forms a mass having a grain size distribution so as to be filled in the cavity under the densest condition.

With this arrangement of the filler assuming the cavity of the tubular body, the amount of the controlled air corresponding to the total volume of the filler can be saved.

This fact will be explained in more detail by calculating the air volume to be used. When the cavity of the tubular body is filled with a filler whose volume is substantially equal to an initial volume of the cavity, an inner volume $V_c$ of the cavity upon applying the controlled air thereinto can be indicated by the following.

$$V_c = \frac{\pi}{4} d^2 \left( \frac{\sin\theta_x^2}{\sin\theta_o^2} \cdot \frac{\cos\theta_x}{\cos\theta_o} - 1 \right) l \quad (5)$$

where
d: inner diameter of the tubular body
l: effective length of the tubular body
$\theta_o$: initial braided angles
$\theta_x$: changed braided angles On the other hand, an inner volume V of the cavity without the filler upon applying the controlled air is indicated by the following.

$$V = \frac{\pi}{4} d^2 \left( \frac{\sin\theta_x^2}{\sin\theta_o^2} \cdot \frac{\cos\theta_x}{\cos\theta_o} \right) l \quad (6)$$

Accordingly, a ratio $f_e$ of the used air for expanding the tubular body in the above two cases is obtained by the following equation (7).

$$f_e = \frac{V_c}{V} = \frac{\left( \frac{\sin\theta_x^2}{\sin\theta_o^2} \cdot \frac{\cos\theta_x}{\cos\theta_o} - 1 \right)}{\left( \frac{\sin\theta_x^2}{\sin\theta_o^2} \cdot \frac{\cos\theta_x}{\cos\theta_o} \right)} \quad (7)$$

As a contractive stress $\epsilon$ is indicated by the equation $$\epsilon = (\cos\theta_o - \cos\theta_x) \quad (2)$$

as above mentioned, $\cos\theta_x$ is given by an equation (8)

$$\cos\theta_x = (1-\epsilon)\cos\theta_o \quad (8)$$

Substituting the equation (8) into the equation (7) gives the following equation (9).

$$f_e = \frac{\sin^2\theta_x \cos\theta_x - \sin^2\theta_o \cos\theta_o}{\sin^2\theta_x \cdot \cos\theta_x} \quad (9)$$

$$= \frac{(1 - \cos^2\theta_x)\cos\theta_x - \sin^2\theta_o \cos\theta_o}{(1 - \cos^2\theta_x)\cos\theta_x}$$

$$= \frac{\{1 - (1-\epsilon)^2\cos^2\theta_o\}(1-\epsilon)\cos\theta_o - \sin^2\theta_o\cos\theta_o}{\{1 - (1-\epsilon)^2\cos^2\theta_o\}(1-\epsilon)\cos\theta_o}$$

From the equation (9), values of $f_e$ are obtained depending upon various values of $\epsilon$ is actual cases with a constant initial braided angle 20° as shown in Table 1.

TABLE 1

| $\epsilon$ | 0.1 | 0.2 | 0.3 |
|---|---|---|---|
| $f_e$ | 0.59 | 0.73 | 0.79 |

As can be seen from Table 1, using the filler according to this embodiment can save the air to be used per one operation by 30% or more in comparison with those without the filler. Accordingly, the total air consumption in operation can be considerably economized.

The actuator shown in FIG. 16 is filled in the cavity with the solid grains 45 as an incompressible fluid substance having no constant shape as a whole, and having a grain size distribution so as to be filled in the cavity under the densest condition. In this case, the cavity is separated from the center apertures 9 by means of strainers 44 each having vent holes 43 located at inner end of the nipple 5.

Figure 17:
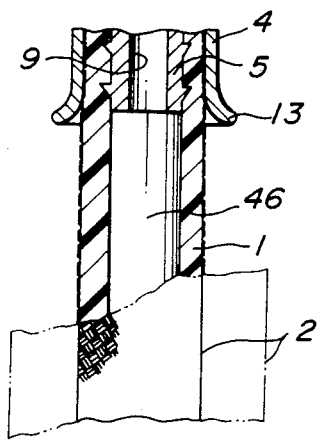
FIG. 17 is a partial sectional view of a modified embodiment of the actuator according to the invention.

FIG. 17 illustrates an embodiment using as a filler a bar-like elastic body 46 flexible only in its expanding and contracting directions.

According to these embodiments shown in FIGS. 16 and 17, the actuator filled in its cavity with a filler can greatly save in air consumption without adversely affecting the advantages of the air-bag type actuator to eliminate its disadvantage of much air consumption.

Instead of the filler in the embodiments, there may be in the tubular body an axially expansible and contractible tube made of a high pressure resistant corrugated membrane having an outer diameter subtantially equal to an inner diameter of the tubular body, the corrugations being axially side by side with each other, or a pneumatic or hydraulic damper in the form of a piston and cylinder assembly.

Figure 18:
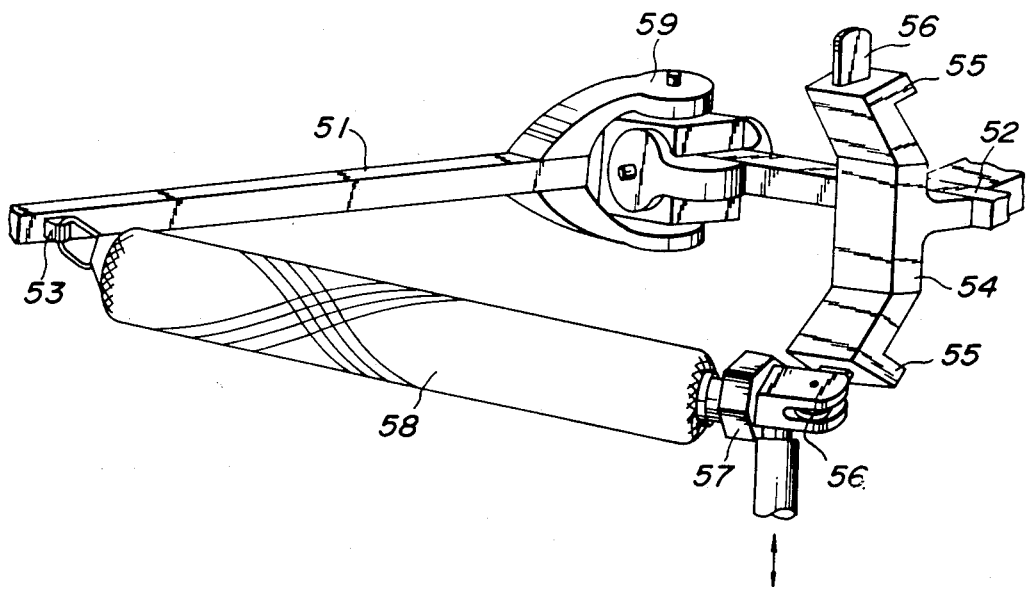
FIG. 18 is a perspective view of an articulated arm or mechanical hand for a manipulator to which actuators (only one shown) according to the invention are applied.

FIG. 18 illustrates an articulated arm or mechanical hand to which actuators according to the invention are applied (only one actuator is shown), wherein first and second arm members 51 and 52 are connected by means of a universal joint 59. A holding member 53 is fixed to the first arm member 51. To the second arm member 52 is fixed a bracket 54 having three protrusions 55 (only two protrusions are shown in the drawing) arranged spaced apart 120° about an axis of the bracket 54. The bracket may be integrally formed with or separately formed from the protrusions 55. A stud 56 is pivotally connected to each protrusion 55. Fittings 57 each having an opening for introducing pressurized fluid or air into the actuator 58 (only one shown) are connected to the studs 56, respectively. The actuator 58 is provided at its one end with an engaging portion adapted to engage the holding member 53 and at the other end with a connecting portion to be connected to the fitting 57 and is pivotally connected to the first and second arm members by means of the holding member 53 and the fitting 57.

Figure 19:
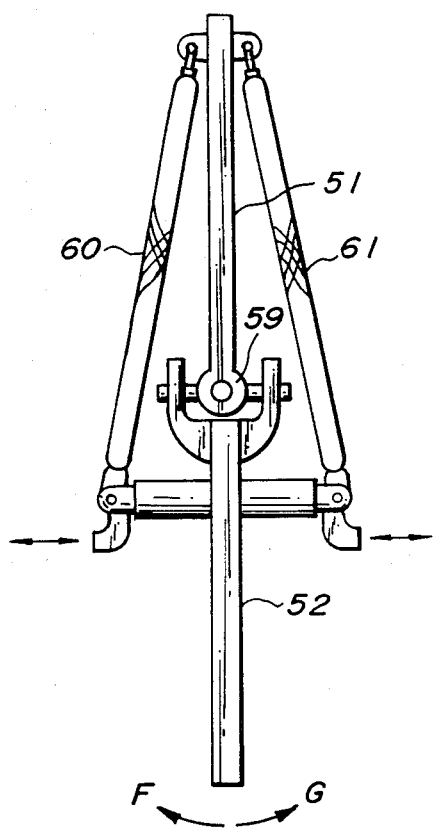
FIG. 19 is another embodiment of the articulated arm shown in FIG. 18.

In this embodiment, although the three actuators 58 are arranged spaced apart 120° about the arm members, two actuators may be arranged spaced apart 180° about the arm members as shown in FIG. 19.

The operation of the articulated arm will be explained hereinafter referring to FIG. 19 for the sake of simplicity. When pressurized fluid or air is supplied into the actuator 60, it is radially expanded but axially contracted. As the result, the second arm member 52 is subjected to a force owing to a contractive force of the actuator 60, so that the second arm member 52 is rotated in a direction shown by an arrow F. If it is required to rotate the second arm member 52 in a direction shown by an arrow G, the pressurized fluid or air is supplied into the actuator 61. When it is required to return the second arm member 52 to its original position, the pressurized fluid or air supplied in the actuator 10 is exhausted therefrom, while pressurized fluid or air is supplied into the other actuator 61.

In this embodiment, the first and second arm members 51 and 52 are connected to each other by means of the universal joint 59. The same operation may be apparently accomplished in case of an articulated joint permitting arm members to move pivotally in a plane.

Although the operation has been explained by referring to the embodiment having the two actuators in FIG. 19, the same operation can be achieved in the embodiment having the three actuators in FIG. 18. In the arrangement in FIG. 18, however, as the three actuators are secured to the first and second arm members 51 and 52 connected by the universal joint, the second arm member 52 can be located at a desired position in a space by suitably introducing the pressurized fluid into the respective actuators.

Figure 20A:
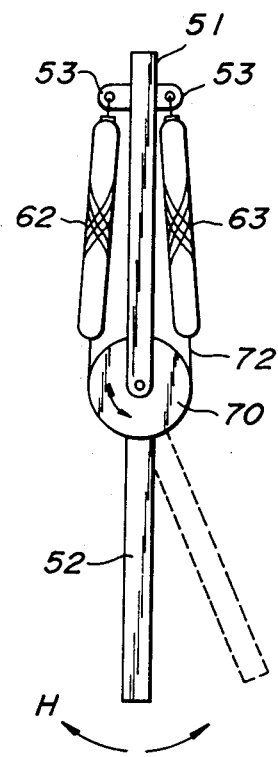
FIG. 20a is a further embodiment of the articulated arm shown in FIG. 18.
Figure 20B:
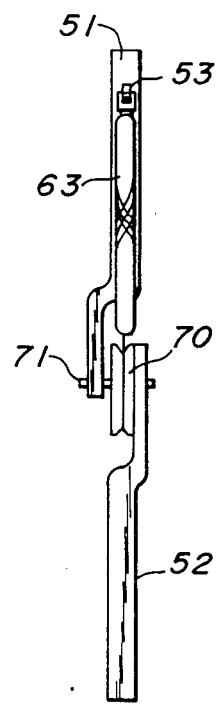

FIGS. 20a and 20b illustrate a preferred embodiment of the invention. To one end of a second arm member 52 is fixed a sheave or pulley 70 whose axle 71 is rotatably mounted in a first arm member 51. One ends of two actuators 62 and 63 are pivotally connected to the first arm member 51 by the use of a holding member 53. The other ends of the actuators 62 and 63 are connected by a wire or rope 22 extending about the pulley 70.

The operation of the arrangement shown in FIGS. 20a and 20b will be explained. When pressurized fluid or air is introduced into the actuator 62, it is axially contracted. As the result, the wire 72 is pulled in a direction in which the actuator 62 contracts, so that the pulley 70 is rotated. Accordingly, the second arm member 52 having the pulley 70 fixed thereto is rotated in a direction shown by an arrow H. If it is desired to return the second arm member 52 to its original position, the pressurized fluid supplied in the actuator 62 is exhausted therefrom, while pressurized fluid is supplied into the actuator 53. A continuous supply of the pressurized fluid into the actuator 63 brings the second arm member 52 into a position shown in broken lines in FIG. 20a.

Although only one pulley 70 is used in this embodiment, pulleys 70 whose axes are perpendicular to each other may be fixed to ends of an intermediate arm member 73 which connects first and second arm members as shown in FIGS. 21a and 21b. Two pairs of actuators 62, 63 and 64, 65 are connected to first and second arm members, respectively to form an articulated arm capable of operating in the same manner as in the articulated arm for a manipulator as shown in FIG. 18. With the embodiment shown in FIGS. 21a and 21b, there is an advantage in that large rotating angles of the arm members are obtained.

As can be seen from the graph in FIG. 5, the larger the contractive strain $\epsilon$, the smaller is the contractive force F. In other words, when the contractive strain $\epsilon$ is small or the arm members start to move, large forces act thereupon. On the other hand, when the strain $\epsilon$ becomes larger, the contractive force becomes smaller. Namely, in the event that the strain $\epsilon$ is larger, a smaller force suffices to rotate arms, so that the arms can easily be moved to desired positions even if the amount of the pressurized fluid is somewhat changed. When using hydraulic or pneumatic cylinders, such as preferable effect cannot be obtained, as shown by a two-dot line I in FIG. 5 which is a relation between displacement of the cylinder and output.

Figure 22A:
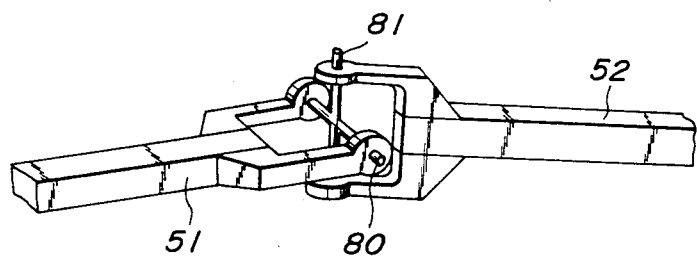
FIG. 22a is a perspective view of a modification of the articulated arm shown in the preceding drawings comprising means for detecting angularly moved angles of arm members of the articulated arm.
Figure 22B:
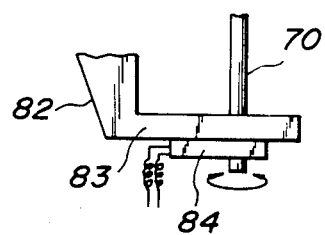

FIGS. 22a and 22b illustrate a further embodiment of the articulated arm for a manipulator. One end of each of shafts 80 and 81 pivotally connect arm members 51 and 52 and extend outwardly of arm portions 83 of connecting members 82. Detecting means 84, for example, potentiometer rotary encoders are fixed to the arm portions 83 and adapted to engage the extending ends of the shafts 80 and 81, respectively. With this arrangement, angularly moved angles of the arm members 51 and 52 can be detected to determine their positions. Moreover, the articulated arm can be moved in any desired manner by controlling amount of the pressurized fluid to be introduced into the actuators depending upon the output of the detecting means 84.

As can be seen from the above embodiments shown in FIGS. 18-22, the articulated arm utilizes the actuators shown in FIGS. 7-17 so as to eliminate any sliding resistance and loss at reduction gears and to thereby operate very smoothly. As the actuators are much lighter than other driving means, the articulated arm does not require high strength arm members and couplings, thereby enabling the articulated arm itself to be very light.

Moreover, the articulated arm according to the invention is driven by pressurized fluid without generating sparks, so that it can be used where there is risk of inflammation and explosion. Furthermore, the actuator according to the invention has the characteristics in that the contractive force is larger when the contractive strain is smaller but the contractive force decreases, as the contractive strain increases. Accordingly, when the articulated arm is started, the large force acts on the arm members and the force driving the arm members becomes smaller as the articulated arm approaches a target. Such a movement of the articulated arm approaching to the target is very similar to the movement of a hand of a man toward a target. Therefore, the manipulation of the articulated arm according to the invention to a desired position is so easy that an unskilled operator is able to manipulate the arm with a very short exercise. Moreover, the rotated angles of the arm members are detected by monitoring means secured to the arm members to position the arm members more exactly. Furthermore, the articulated arm according to the invention can be constructed so as to be able to automatically position the arm members.

Figure 23:
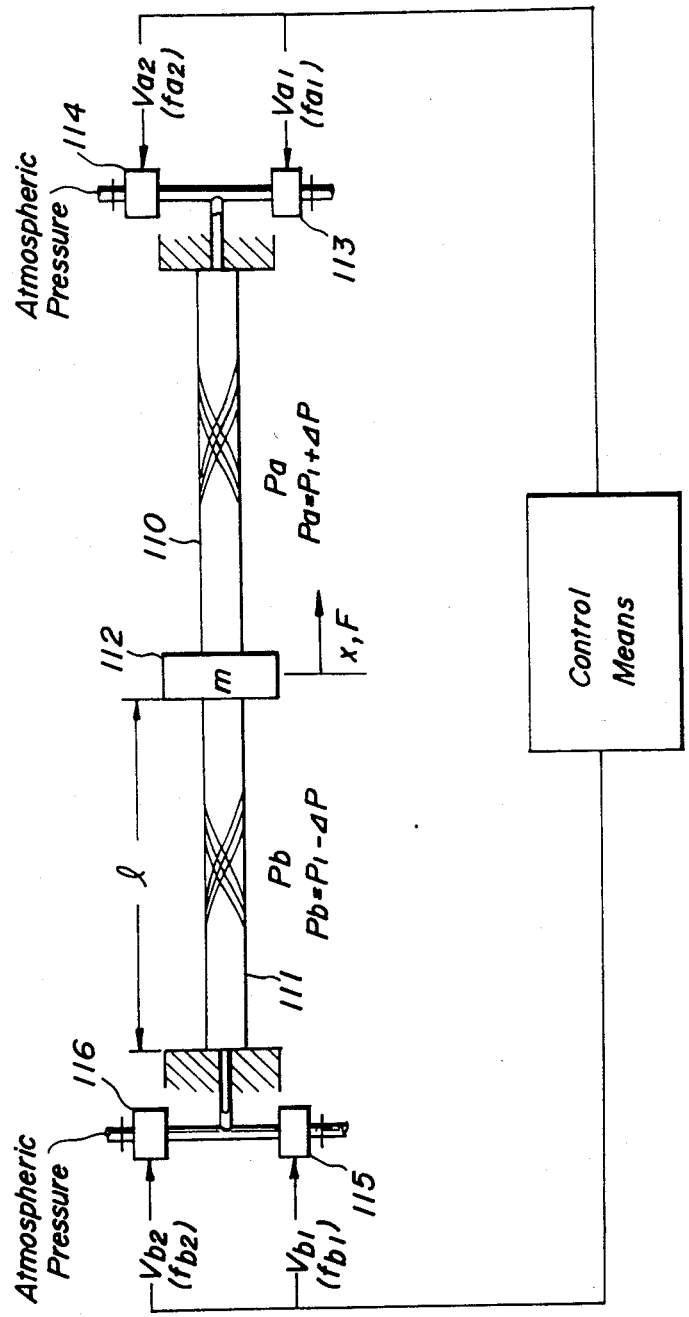
FIG. 23 illustrates a schematic arrangement of a driving control system to which are applied actuators according to the invention.

FIG. 23 illustrates a preferred driving control system to which is applied the actuators according to the invention. The actuators 110 and 111 have one end fixed to fixed walls and opposite ends connected to a connecting member or mass point 112. Reference numerals 113, 114, 115 and 116 denote flow control valves preferable for the actuators, which are electromagnetic flow control valves for controlling the flow rate of pressurized fluid or air flowing in and out of the actuators according to control signals from control means.

Figure 24:
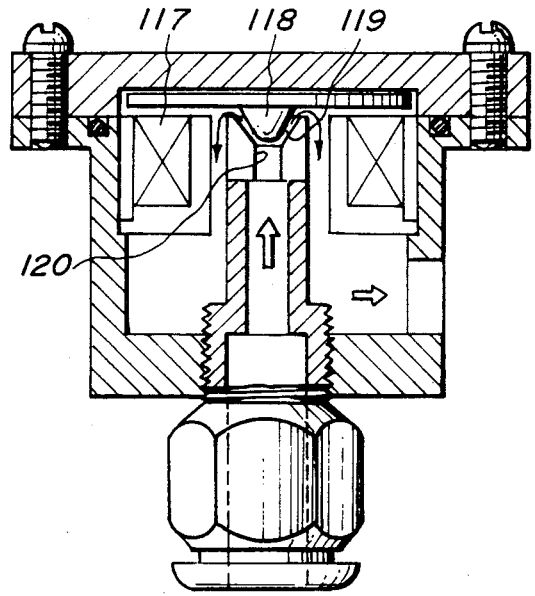
FIG. 24 is a sectional view of an electromagnetic flow control valve to be used in the control system shown in FIG. 23.

FIG. 24 illustrates one example of the control valve which is capable of changing coil voltage acting upon an electromagnet 117 to continuously change the force urging a valve body 118 toward a valve seat 119 against the energy of the pressurized fluid, thereby controlling its flow rate. Other flow control valves may be applied to the present system so long as they can continuously control flow rate according to control signals.

The operation of the arrangement shown in FIGS. 23 and 24 will be explained. When controlled air pressure P is applied to the actuators, contractive force F is indicated by the equation (4) above mentioned and is modified as an equation (10).

$$F = \frac{\pi}{4} D_o^2 P \frac{1}{\sin^2\theta_o} \{3(1-\epsilon)^2\cos\theta_o - 1\} \quad (4)$$

$$\div K_1 P - K_2 P \epsilon \quad (10)$$

where $$\left. \begin{array}{l} K_1 = \frac{\pi}{4} D^2 \frac{3\cos^2\theta - 1}{\sin^2\theta_o} \\[6pt] K_2 = \frac{3}{2} \pi D^2 \frac{\cos^2\theta_o}{\sin^2\theta_o} \end{array} \right\} \quad (11)$$

Under an equilibrium condition that reference pressure $P_1$ is applied to both the actuators 110 and 111, in order to move the mass point 112 through a distance x the flowing-in control valve 113 is opened and flowing-out control valve 114 is partially closed to further apply a pressure $\Delta P$ to the actuator 110 in response to a control signal from the control means. On the other hand, the flowing-in control valve 115 is partially closed and the flowing-out control valve 116 is opened to apply a pressure $-\Delta P$ to the actuator 111. Accordingly, the actuator 110 is subjected to the pressure $P_a = P_1 + \Delta P$ and the actuator 111 is subjected to the pressure $P_b = P_1 - \Delta P$.

The force acting upon the mass point 112 is newly assumed as F and calculated from the equation (10) in the following manner.

$$F = K_1(P_1 + \Delta P) - K_2(P_1 + \Delta P)\epsilon_a - K_1(P_1 - \Delta P) + K_2(-P_1 - \Delta P)\epsilon_b \quad (12)$$

where $$\left. \begin{array}{l} \epsilon_a = \dfrac{l_o - l - x}{l_o} \\[6pt] \epsilon_b = \dfrac{l_o - l + x}{l_o} \end{array} \right\} \quad (13)$$

where $l_o$ is a length of the actuators under a normal or unloaded condition (the lengths of the actuators are made equal for the sake of simplicity).

Substituting the equations (11) and (13) into the equation (12) and arranging give the following equation (14).

$$F = K_p \Delta P - P_1 K_x x \quad (14)$$

where $$\left. \begin{array}{l} K_p = \dfrac{\pi D^2}{2\sin^2\theta_o} \left\{ \left( \dfrac{6l}{l_o} - 3 \right) \cos^2\theta_o - 1 \right\} \\[8pt] K_x = \dfrac{3\pi D^2 \cos^2\theta_o}{l_o \sin^2\theta_o} \end{array} \right\} \quad (15)$$

Figure 2:
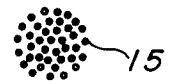
FIG. 2 is a schematic cross-sectional view of a cord constituting a braided structure for a pneumatic actuator of the prior art.
Figure 3:
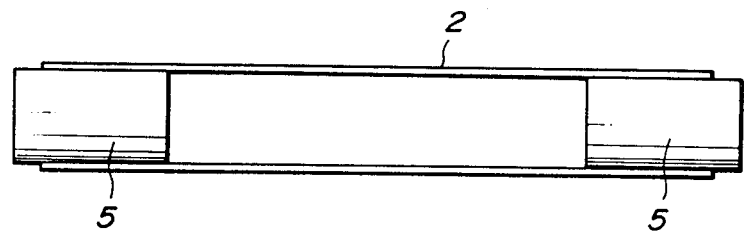
FIG. 3 is a schematic sectional view of a pneumatic actuator of the prior art for explaining operation of the actuator of the prior art.
Figure 4:
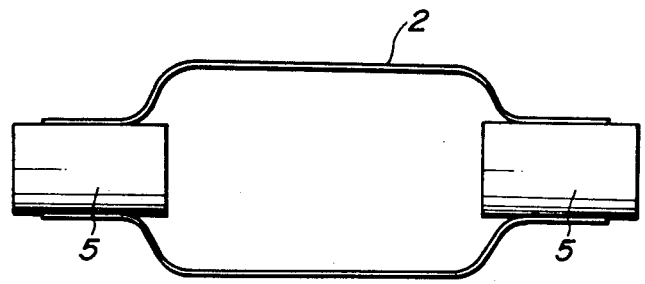
FIG. 4 is a schematic sectional view of the actuator shown in FIG. 3, when expanded.

The equation (14) indicates a relation between the force, pressure and displacement of the mass point in FIG. 2.

In this case, the pressure is given in the following.

$$\left. \begin{array}{l} P_0 A - f_{a1} \leq P_a A \leq f_{a2} \\ P_0 A - f_{b1} \leq P_0 A \leq f_{b2} \end{array} \right\} \quad (16)$$

where $f_{a1}$, $f_{a2}$, $f_{b1}$ and $f_{b2}$ are electromagnetic forces of the flow control valves, respectively and A is an effective sectional area of a nozzle portion 120 of the electromagnetic flow control valves.

Assuming that input voltage $V_a$ to the coil is proportional to electromagnetic force, input voltage is applied to the electromagnetic control valves 113 and 114 of the actuator 110 so as to achieve the relation of $f_{a1} = -P_o A - KV_a$ and $f_{a2} = KV_a$ (K is proportional constant). From these relations, the following equation (17) is obtained in consideration of the equation (16).

$$P_o A - (P_o A - KV_a) \leq P_a A \leq KV_a \quad (17)$$

The equation (17) is modified to obtain $P_a = (K/A)V_a$ which means that the input voltage can control the pressure $P_a$ of the actuator 110.

Figure 25:
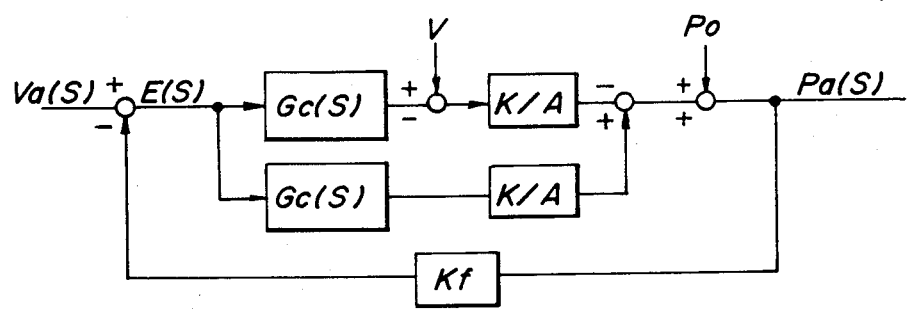
FIG. 25 shows a preferred feedback compensation circuit for use in the control system shown in FIG. 23.

In general, however, the relation between the input voltage and electromagnetic force involves the problems of hysteresis and is non-linear. Accordingly, a control circuit for this system according to the invention comprises a circuit for feedback compensation shown in FIG. 25. An element $G_c(S)$ in the drawing is a foward element, such as an integral or integral-differential element. For example, when it is the integral-differential element, the forward element is $G_c(S) = (1 + T_D S)/T_I S$. As the result, the input voltage $V_a$ is proportional to the pressure $P_a$. Although there is delay between $V_a(S)$ and $P_a(S)$, it is a time-lag of first order as shown in an equation (18), so that it gives an approximate value without any trouble.

$$P_a(S) = \frac{K_v}{TS + 1} V_a(S) \quad (18)$$

where $K_v$ is a proportional sensitivity.

The similar compensation is effected as to the actuator 111 to obtain the following equation (19).

$$P_b(S) = \frac{K_v}{TS + 1} V_b(S) \quad (19)$$

Figure 26:
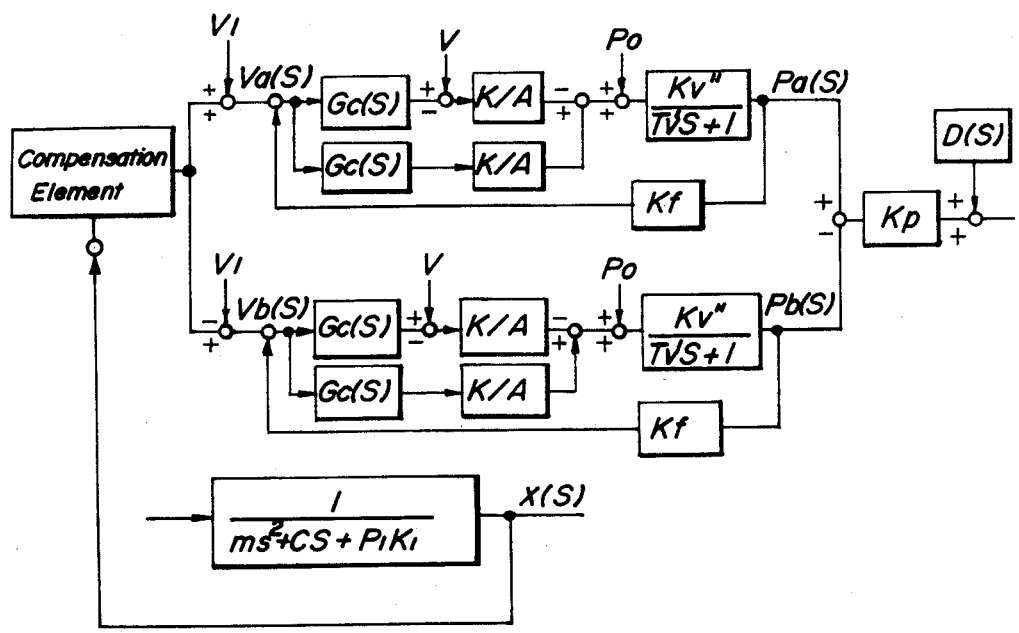
FIG. 26 is a block diagram of a feedback compensation circuit to be used in the system shown in FIG. 23 when used for positional controlling.

The force F acting on the mass point 112 is given by $$F = F_p \Delta P - P_1 K_x x \quad (14),$$

a kinematic equation of this system is indicated by the following equation (20).

$$m\ddot{x}+c\dot{x}+P_1K_xx=K_p\Delta P+D \tag{20}$$

where m is mass of the mass point 112, c is an equivalent coefficient of viscosity and D is an external force acting upon this system. FIG. 26 illustrates a block diagram for effecting positional control by the system representative of the equation (20) or shown in FIG. 23. Accordingly, providing one integral element in each the compensation element makes zero the steady-state deviation of the system.

As can be seen from the equation (14), moreover, with the driving control system according to the invention, the force acting upon the mass point is determined only by the pressure difference $\Delta P$ independently from the reference pressure which may be set at various values. The system according to the invention is insusceptible to external disturbance acting upon actuators and exhibits a high compliance.

Figure 27:
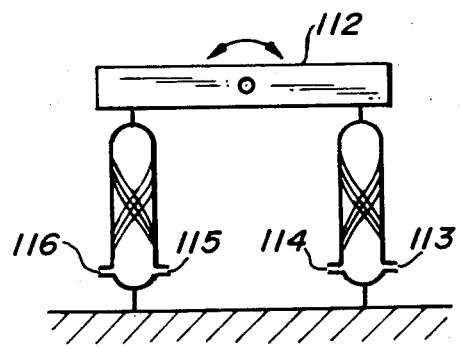
FIG. 27 is a schematic view of a modification of the control system shown in FIG. 23.

Although the system according to the invention has been explained with the linear driving system, the invention may be applicable to a rockable or swingable system as shown in FIG. 27 or a system for controlling force acting on a connecting portion. Flowing-in and flowing-out control valves may be provided directly on actuators. Valves formed integrally with fitting are more preferable because they eliminate pipings for supplying pressurized fluids.

The above driving control system according to the invention comprising the four electromagnetic flow control valves for controlling flow rate by changing coil voltage acting upon electromagnets is superior in responsibility in comparison with prior art systems and able to do positional control of arms without being affected by inherent nonlinearity of the system. The flow control valves are inexpensive in comparison with hitherto used servo-valves to greatly contribute decrease of manufacturing cost. The system according to the invention does not leak the pressurized fluid under steady-state condition, so that the consumption of the pressurized fluid is minimum and noise of exhaust fluid is eliminated. In hitherto used systems adapted to control pressure, the higher the pressure, the larger is the force acting on the system. In contrast herewith, according to the invention, pressure difference is utilized to change the force, so that the compliance of the system can be changed by changing reference pressure as the case may be.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A pneumatic actuator comprising; a tubular body made of rubber-like elastic material, closure members sealingly closing ends of said tubular body and braided structure reinforcing an outside of said tubular body and made of braided cords of high tensile fibers, said braided structure being expanded in its radial direction and being simultaneously contracted in its axial direction together with said tubular body when pressurized fluid is supplied in a cavity of said tubular body through one of said closure members, wherein diameters of both ends of said braided structure and braided angles at both ends are made larger than those at a substantially mid portion of said braided structure.

2. A pneumatic actuator as set forth in claim 1, wherein said braided cords of said braided structure comprise monofilaments each having a smoothly rounded outer surface of a large radius of curvature.

3. A pneumatic actuator as set forth in claim 2, wherein said monofilament comprises a number of fine filaments twisted to form a bundle and a rubber-like elastomer coated on said bundle.

4. A pneumatic actuator as set forth in claim 2, wherein said monofilament has an elliptical cross-section.

5. A pneumatic actuator as set forth in claim 1, wherein a protective layer is provided between said tubular body and said braided structure.

6. A pneumatic actuator as set forth in claim 5, wherein said protective layer is finely braided so as to be expansible and contractible in a tricot weave.

7. A pneumatic actuator as set forth in claim 5, wherein said tubular body consists of two elastic layers to form said tubular body an inner layer and an outer layer and, said protective layer formed the outer layer and made of an elastomer highly resistant to damage.

8. A pneumatic actuator as set forth in claim 1, wherein a filler is provided in said cavity of the tubular body without obstructing the expansion and contraction of the tubular body.

9. A pneumatic actuator as set forth in claim 8, wherein said filler is an incompressible fluid substance having no constant shape.

10. A pneumatic actuator as set forth in claim 8, wherein said filler is solid grains having a grain size distribution to be filled under the densest condition. 1

11. A pneumatic actuator as set forth in claim 8, wherein said filler is a bar-like elastic body flexible only in its expanding and contracting directions.

* * * * *